United States Patent [19]

Honcik et al.

[11] Patent Number: 5,761,625
[45] Date of Patent: Jun. 2, 1998

[54] RECONFIGURABLE ALGORITHMIC NETWORKS FOR AIRCRAFT DATA MANAGEMENT

[75] Inventors: David B. Honcik, Kirkland; Martin T. Shetter, Bellevue, both of Wash.

[73] Assignee: AlliedSignal Inc., Morristown, N.J.

[21] Appl. No.: 473,052

[22] Filed: Jun. 7, 1995

[51] Int. Cl.[6] .................................................. G06G 7/76
[52] U.S. Cl. .......................... 701/14; 340/963; 364/550
[58] Field of Search ................ 364/424.06, 424.01, 364/433, 434, 427, 430, 551.01, 428, 550, 424.03, 424.04, 439, 435, 461; 340/973, 975, 968, 963, 969, 970, 971; 244/186, 177, 194, 195, 76 R, 17.13, 181; 360/5; 701/14, 24

[56] References Cited

U.S. PATENT DOCUMENTS

| | | | |
|---|---|---|---|
| 3,745,671 | 7/1973 | Mortimer | 434/45 |
| 4,312,041 | 1/1982 | DeJonge | 364/431.02 |
| 4,409,670 | 10/1983 | Herndon et al. | 364/424.06 |
| 4,470,116 | 9/1984 | Ratchford | 364/424.06 |
| 4,604,711 | 8/1986 | Benn et al. | 364/424.06 |
| 4,626,996 | 12/1986 | Arlott | 364/424.06 |
| 4,642,775 | 2/1987 | Cline et al. | 364/444.2 |
| 4,729,102 | 3/1988 | Miller, Jr. et al. | 364/424.06 |
| 4,823,271 | 4/1989 | Clark et al. | 364/443 |
| 4,849,893 | 7/1989 | Page et al. | 364/434 |
| 4,852,031 | 7/1989 | Brasington | 364/578 |
| 5,111,402 | 5/1992 | Brooks et al. | 364/424.04 |
| 5,270,931 | 12/1993 | Appleford | 364/424.012 |
| 5,404,528 | 4/1995 | Mahajan | 395/650 |
| 5,457,634 | 10/1995 | Chakravarty | 364/424.012 |
| 5,493,497 | 2/1996 | Buus | 364/424.013 |

FOREIGN PATENT DOCUMENTS

| | | | |
|---|---|---|---|
| 0 431 662 A1 | 6/1991 | European Pat. Off. | G05O 1/00 |
| 2 667 171 A1 | 3/1992 | France | G06F 9/06 |
| 43 10 615 A1 | 10/1994 | Germany | |

OTHER PUBLICATIONS

"Q'Nial: A Portable Interpreter For The Nested Interactive Array Language, Nial"—Software Practice & Experience, vol. 19, No. 2, Feb., 1989 (111-126).

Primary Examiner—Jacques H. Louis-Jacques

[57] ABSTRACT

An aircraft data management system which uses a reconfigurable algorithmic network to defines operations on a set of flight data along with interpreters to interpret the flight data in accordance with the reconfigurable algorithmic network. The reconfigurable algorithmic network accepts flight data from a variety of sources. The reconfigurable network defines functional relationships between and performs operations on the various flight data. The flight data sources and the relationships therebetween can be configured by the user. The aircraft data management system can be used with a variety of computers and operating systems without reprogramming while minimizing certification requirements.

23 Claims, 6 Drawing Sheets

RECONFIGURABLE ALGORITHMIC NETWORKS FOR AIRCRAFT DATA MANAGEMENT

FIELD OF THE INVENTION

The invention generally relates to the field of aircraft flight data systems and in particular to flight data management systems for use with commercial aircraft.

BACKGROUND OF THE INVENTION

The advent of digital flight data systems, which can utilize as many as 20,000 different flight parameters from sensors in a commercial aircraft, has provided aircraft operators as well as flight crews with the opportunity to obtain data on a wide variety of operational, maintenance and flight safety matters. The availability of this data has proven to be very useful in the operation of commercial aircraft. However, different operational groups within an airline frequently have different requirements as far as types of flight data that they find useful as well as the manner in which the data is analyzed, displayed and reported. For example, a flight crew would find data related to airspeed and attitude particularly useful whereas maintenance personnel would be more interested in data related to engine and electrical systems. In addition each airline tends to have its own unique requirements and uses for flight data.

Because of the shear magnitude of flight data that is available and the differing requirements of airlines as well as groups within the airlines, providing this data in a useful form has become an expensive and time consuming task. Currently, not only is it necessary to create separate data handling computer programs for each group utilizing this flight data, but this process is further complicated by the fact that different types of computer hardware are often used by these groups. As an example, data management units located in aircraft which operate off an ARINC data bus normally utilize an entirely different microprocessor and operating system than ground based workstations that typically use a personal computer with the Windows® operating system. To further complicate the situation, it is a requirement of most governmental flight regulation authorities, such as the U.S. Federal Aviation Administration, that software used with commercial aircraft must be officially certified. Not only must the original programs be certified, but in most instances any time any change is made in a program, the program must be recertified. This substantially increases the expense as well as the time required to create and modify data management software for use with flight data.

SUMMARY OF THE INVENTION

It is therefore an object of the invention to provide an aircraft data management system that can be used with a variety of computers and operating systems without reprogramming while minimizing certification requirements.

It is a further object of the invention to provide an aircraft data management system which uses a reconfigurable algorithmic network to defined operations on a set of flight data along with interpreters to interpret the flight data in accordance with the reconfigurable algorithmic network.

It is an additional object of the invention to provide an aircraft data management system having a reconfigurable algorithmic network where individual operations on flight data are represented by functional elements connected together so as to define the operational relationships between the functional elements.

Another object of the invention is to provide a development system having a display for use with an aircraft data management system for developing reconfigurable algorithmic networks where functional elements of the network are represented on the display by element symbols and are connected together by data lines which represent the functional relationships between the functional elements in the network. The color of the data lines can be used to represent data types. Various element symbols can be used to represent flight data parameter sources, data and logic operations, timer and counter operations and report generators. Construction of the network can be facilitated by displaying a palette of element symbols and using a mouse for point and click operations to select element symbols for the network from the palette and connecting the selected symbols by drawing data or connection lines between the symbols.

A still further object of the invention is to provide a simulator having an interpreter and a source of simulated flight data for use with an aircraft data management system that utilizes reconfigurable algorithmic networks. The simulator can form part of a development system and be used in development and testing of reconfigurable algorithmic networks by utilizing the interpreter to interpret a network using the simulated flight data.

An additional object of the invention is to provide an aircraft data management system that uses a hierarchy of reconfigurable algorithmic networks where flight data operations are represented by functional elements in a network and compressed reconfigurable algorithmic networks are also represented by functional elements in the network. Each reconfigurable algorithmic network can contain a number of compressed reconfigurable algorithmic networks which in turn can contain other compressed reconfigurable algorithmic networks represented as functional elements so that a hierarchy of networks is formed.

Another object of the invention is to provide an aircraft data management system that utilizes a number of different reconfigurable algorithmic networks having functional elements that represent data operations where the reconfigurable algorithmic networks can be interpreted on different types of computers with interpreters written for each of the computers. The data management system can include an aircraft data management unit with a first one of the reconfigurable algorithmic networks for generating flight data reports for the flight crew and a ground based report system having a second one of the reconfigurable algorithmic networks for generating operational and maintenance data. The system can also include a radio transmission system, such as ACARS, for transmitting flight data or reports generated by a reconfigurable algorithmic network from the aircraft in flight to the report system. The radio transmission system can also be used to transmit reconfigurable algorithmic networks to the aircraft's data management unit. In addition, flight data can be transferred to the report system by other types of media including floppy disks or flight data recorder tapes.

DETAILED DESCRIPTION OF THE INVENTION

Figure 1:
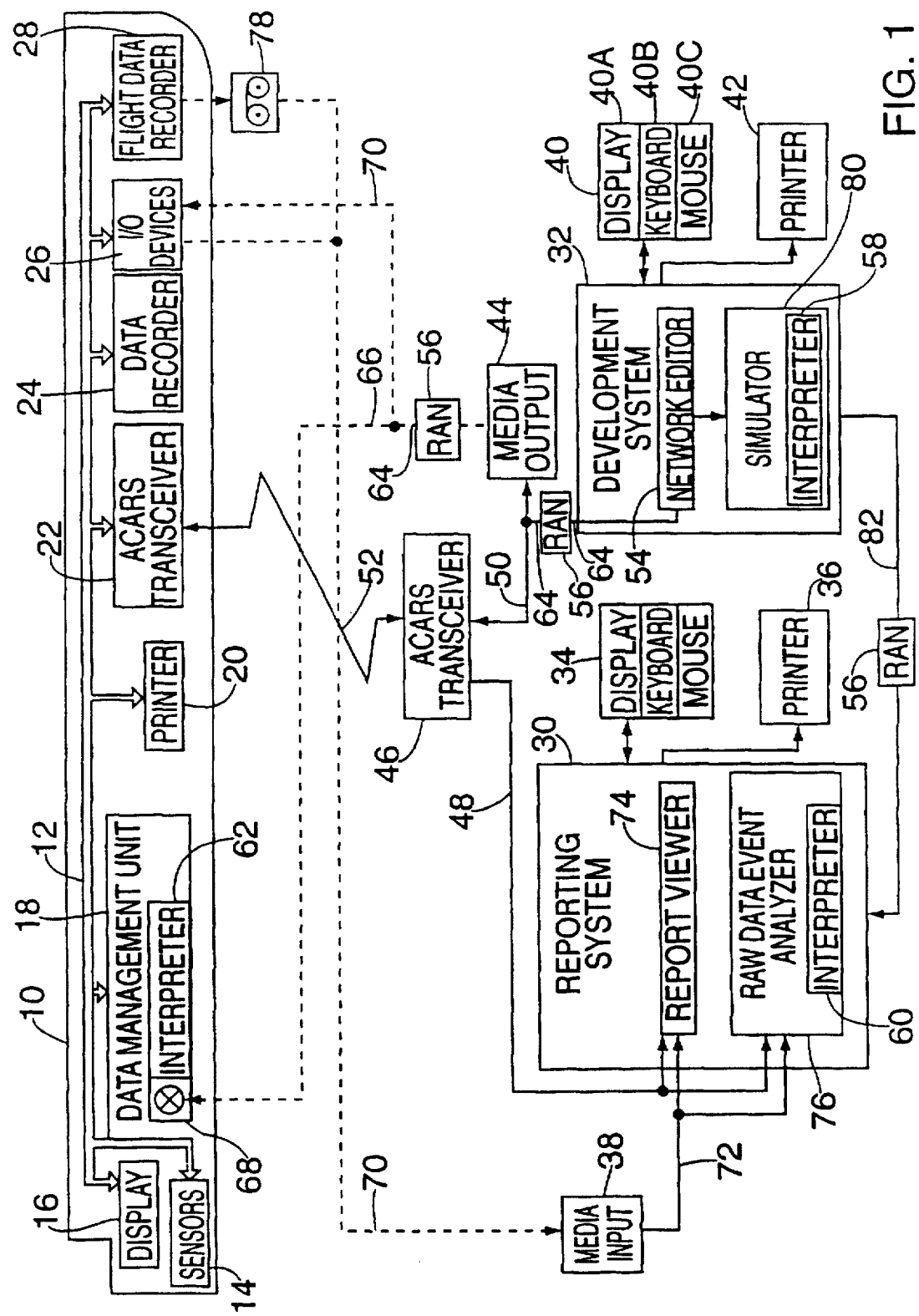
FIG. 1 is a block diagram illustrating an aircraft data management system according to the invention.

FIG. 1 provides, in block diagram form, an illustration of the preferred embodiment of an a aircraft data management system for use with an aircraft 10 according to the invention. As is typical of modern commercial aircraft, a digital data bus 12, such as the type of data bus utilized in connection with the ARINC 429 Digital Information Transfer System, is used to transfer data to and from various types of equipment installed in the aircraft 10. Representative examples of this equipment are shown in the aircraft 10 of FIG. 1 and include a set of sensors, represented by a block 14, for generating flight data such as airspeed, altitude, aircraft attitude, control surface positions and engine conditions. Other types of equipment connected to the data bus 14 can include a cockpit display 16, a data management unit 18 for monitoring and collecting data as part of an aircraft condition monitoring system, a printer 20 for providing the flight crew with printed reports and other types of communications, an ACARS (ARINC Communications Addressing and Reporting System) transceiver 22 for data communication with the ground, a data recorder 24 for recording flight data generated by the sensors 14, a set of input/output devices 26 that can receive various types of data transfer media such as floppy disks, tape cassettes or PCMCIA cards for transferring information from and to the aircraft 10, and a crash survivable flight data recorder 28.

The ground based portion of the data management system of FIG. 1 includes a reporting system 30 and a development system 32. The reporting system 30, which can be implemented in a personal computer or a computer work station, includes a user interface 34, typically having a monitor display, a keyboard and a mouse, a printer 36 and a media input device 38 for receiving various types of data media such as floppy disks, tape cassettes or PCMCIA cards. The development system 32, which also can be implemented in a personal computer or a computer work station preferably using the Windows® operating system, includes a user interface 40 having a monitor display 40A, a keyboard 40B and a mouse 40C along with a printer 42 and a media output device 40 similar to the media input device 38. Additionally included in the ground based portion of the data management system is an ACARS transceiver 48 which is shown in this embodiment as being connected to both the reporting system 30 and the development system 32 as indicated by a pair of lines 48 and 50 respectively. One of the purposes of the ACARS transceiver 48 is to communicate with the aircraft based ACARS transceiver 22 as indicated by a line 52.

In order to provide for efficient and flexible data management of the some 20,000 different types of flight data that can be produced by the sensors 14 on modem commercial aircraft, the development system 32 contains a network editor software program, indicated by a block 54, which is used to develop a series of reconfigurable algorithmic networks (RANs) as graphically represented in FIG. 1 by blocks 56. One of the purposes of the RANs 56 is to define a set of operations to be performed on selected flight data obtained from the sensors 14 and to format reports that will display the results of the operations on the data once it has been processed. Operation of the network editor 54 in the creation of the RANs 56 is explained in detail in connection with FIGS. 3–6. After the RAN 56 has been created, it is interpreted in conjunction with the selected flight data by an interpreter program such as a development system interpreter 58 located in the development system 32, a reporting system interpreter 60 located in the reporting system 30 or a data management unit interpreter 62 located in the data management unit 18. In this embodiment of the invention shown in FIG. 1 each of the interpreters 58–62 are capable of interpreting the RANs 56 but can be designed to run on different computer hardware systems. For example, the reporting system interpreter 60 could be written to run on an Intel mircroproccessor using a Windows operating system while the data management unit interpreter 62 would be written to run on an Intel I960 microprocessor in the data management unit 18.

One of the primary advantages of this approach is that the RANs 56, which define data management operations, are hardware independent. Also, this approach can substantially reduce certification requirements because once the interpreters 58–62 are certified for particular computer systems such as the data management unit 18, and because merely interpreting the RAN 56 does not affect the database on the aircraft 10, it should not be necessary to obtain recertification every time the RAN 56 is modified or a new RAN 56 is created.

There are a wide variety of uses for the data management system of FIG. 1. For example, one of the RANs 56 can be created in the network editor 54 and transmitted to the media output device 44 via a line 64 and then, as indicated by a dashed line 66, hand carried on a floppy disk or tape cassette to the aircraft 10 where it is loaded through a RAN loader 68 directly into the data management unit 18 or alternatively loaded into the I/O device 24 as indicated by a dashed line 70. If the aircraft 10 is in flight, the RAN 56 can be sent to the ACARS transceiver 46 over the line 50 and then transmitted to the ACARS transceiver 22. After the RAN 56 is interpreted by the interpreter 62, the resulting report can be printed out by the printer 20, displayed to the cockpit crew on the display 16, recorded in the data recorder 24, placed on data media in the I/O device 26 or transmitted to the ACARS transceiver 46 from the ACARS transceiver 22 depending upon the nature and the purpose of the report. If the report is placed on data media in the I/O device 26, it can then later be hand carried to the media input device 38, as indicated by a dashed line 70 and transmitted via a line 72 to a report viewer program 74 in the reporting system 30 for display on the user interface 34 or printing on the printer 36. In the event the aircraft 10 is airborne, the report can be transmitted via the ACARS transceiver 46 to the report viewer 74 over the line 48.

The data management system of FIG. I can also make use of raw flight data from the sensors 14 by transmitting the raw flight data by means of the ACARS transceivers 22 and 46 directly to a raw data event analyzer 76 in the reporting system 30 where the RAN 56 is interpreted by the interpreter 60 using the raw flight data as data. The resulting report can then be displayed on the user interface 34 or printed out on the printer 36. As an alternative, the raw flight data can be loaded on to data media in the I/O device 26 and hand carried, as suggested by the dashed line 70, to the media input device 38 where it is subsequently transferred to the raw data analyzer 76 over line 72. It is even possible to analyze data from the crash survivable flight data recorder 28 by transferring a cassette 78 from the recorder 78 to the media input device 38 as indicated by the dashed line 70 for analysis by the RAN 56 as interpreted by the interpreter 60.

To aid in the development of the RANs 56, the development system 32 preferably contains a simulator program 80 that includes a data base of simulated flight data (not shown.) The simulator interpreter 58 can be used to test and debug the RAN 56 as it is being developed. It should also be noted that the development system 32 can distribute the RANs 56 directly to one or more of the reporting systems 30 by using a digital network such as a local area network as indicated by a line 82.

Figure 2:
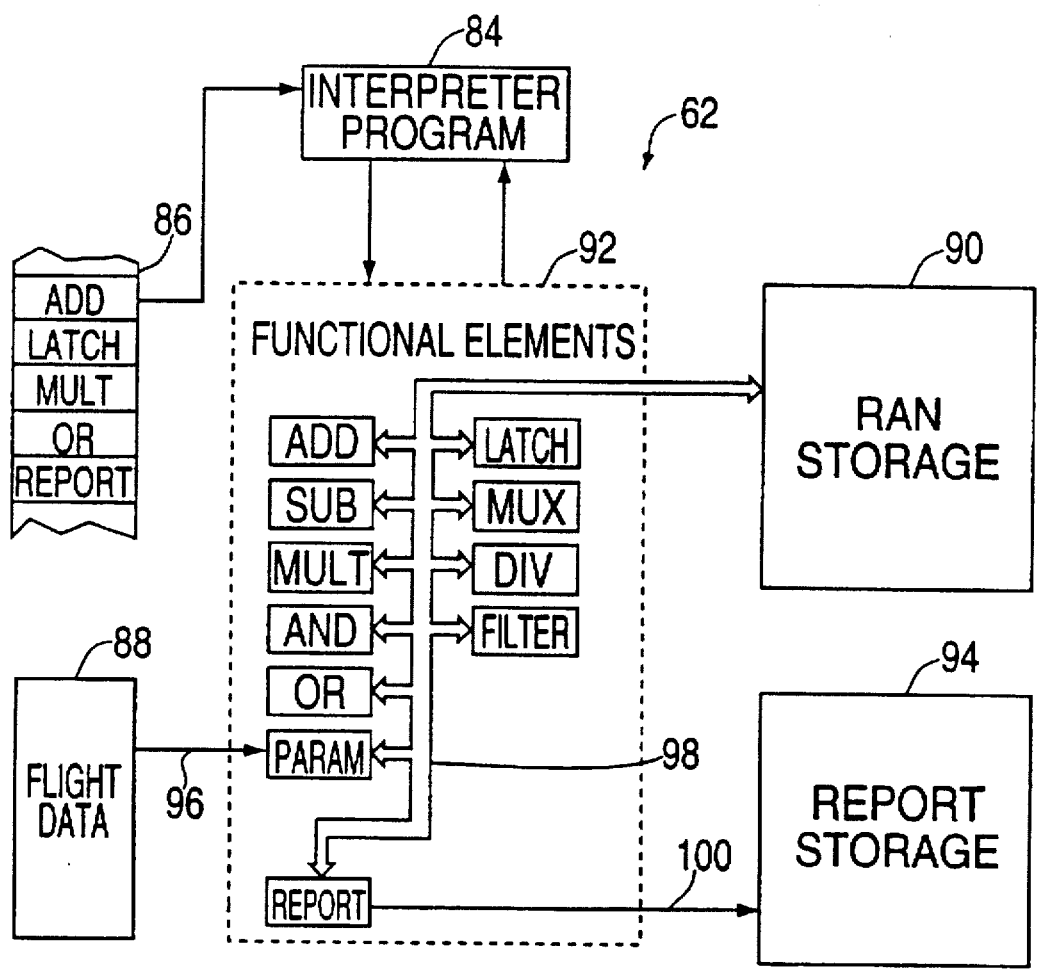
FIG. 2 is flow diagram illustrating the operation of an interpreter used in the data management system of FIG. 1.

Operation of the of the interpreters 58–62 will be described in connection with the flow diagram of in FIG. 2. Preferably, all of the interpreters 58–62 will be essentially the same program written in the C language and only modified to the extent necessary to run on different types of computer hardware. Since all of the interpreters 58–62 operate in the same manner, the flow diagram of FIG. 2 will discussed in terms of the interpreter 62 installed in the data management unit 18. It should be noted also that the interpreter 62 is created using conventional and well known interpreter programming techniques such as used in writing Basic interpreters. The interpreter 62 includes a interpreter program 84 which accepts the RAN 56 in the form a RAN database 86. In this case the RAN database 86 is composed of a series of codes representing functional elements which are identified in the database 86 shown in FIG. 2 as an ADD, a LATCH, a MULTIPLY, an OR gate and a REPORT. The functional elements which represent various types of operations such as operations on flight data are more fully described in connection with FIG. 3. Included in the depiction of the interpreter 62 in FIG. 2 is a source of flight data 88, that in this case could be, for example, the aircraft data bus 12, and a RAN storage area 90 that would normally be located in a random access memory. In addition, a group of computer routines for executing functional elements identified as the ADD function through the REPORT function is located in memory as indicated in a block 92. A report storage area 92 is also provided in memory for storing report data generated by the interpreter 62.

During the interpreting operation the interpreter 62 under control of the program 84 receives the function element codes in sequence from the database 86 and selects the corresponding computer routines for the corresponding functional elements from memory 92 for execution. If the selected computer routine is for example the ADD function and requires flight data from the flight data source 88, this data is obtained by the PARAM routine from the flight data source 88 as indicated by a line 96. As indicated by a bus type line 98, which generally represents data and logic flow, this flight data is operated on by the ADD routine and the result is stored in the RAN storage memory 90. The RAN storage 90 is also used to store other types of RAN information such as RAN connection lines that are used to connect functional elements in the RAN 56 which are described in more detail in connection with FIG. 3. In many cases the last function to be performed on the RAN 56 by the interpreter 62 is the REPORT function resulting in the REPORT routine in 92 selecting the appropriate information from the RAN storage 90, formatting it and transferring it as indicated by a line 100 to the report storage 94 where it becomes, for example, available for printing out on the aircraft printer 20 or displaying on the display 16. In this manner, the interpreter program 84 responds to the sequence of the RAN codes 86 to perform the data management operations as defined by the RAN 56.

Figure 3:
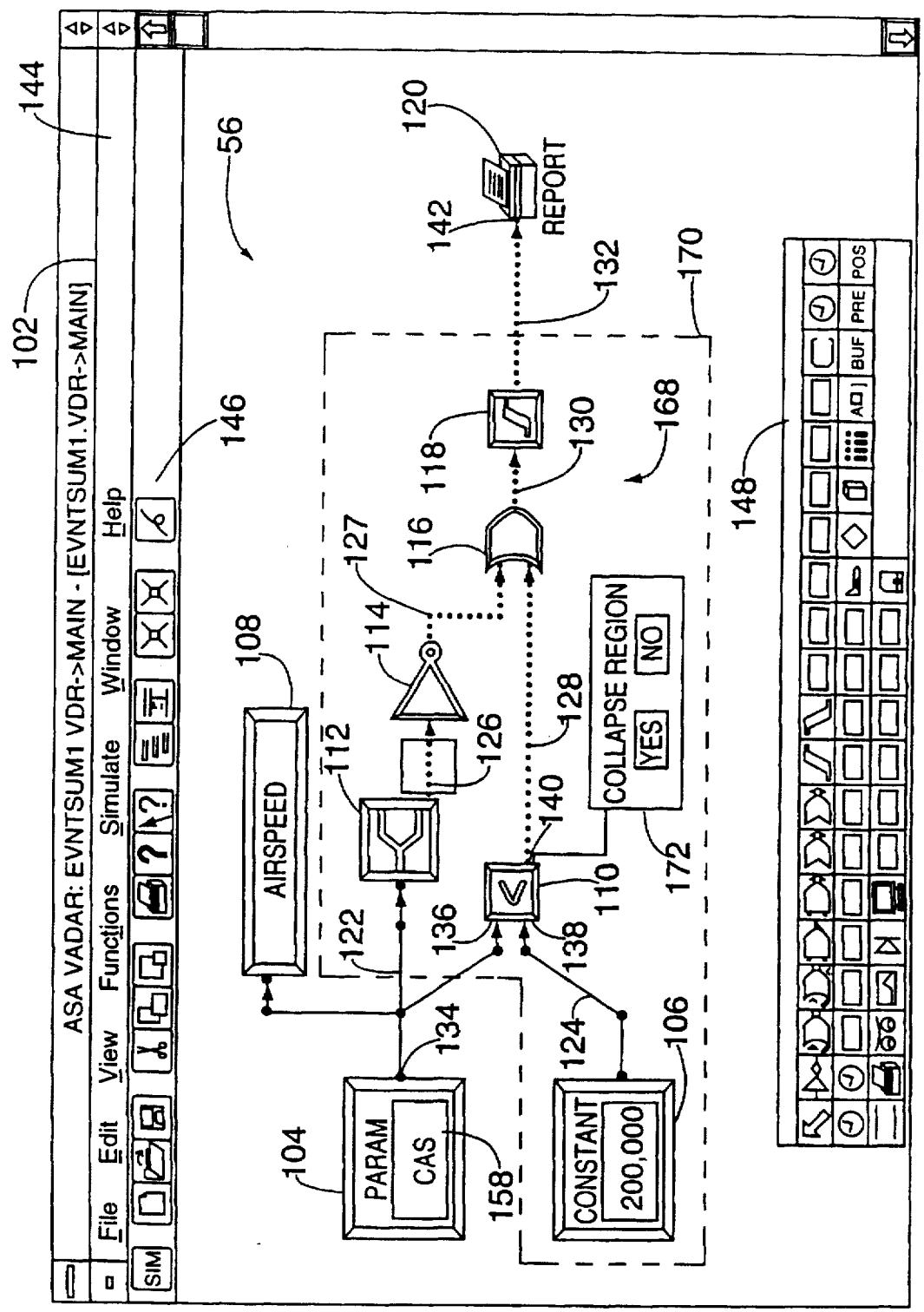
FIG. 3 is a view of a screen display of a reconfigurable algorithmic network for use with the data management system of FIG. 1.

FIG. 3 shows an example of one the RANs 56 as displayed on the display 40A of the development system 32.

In the preferred embodiment of the invention the network editor 54 is implemented using the Microsoft Windows operating system and makes use of the point and click capabilities of the mouse 40C. Although the preferred embodiment of the network editor 54 is described in terms of a Windows environment, it will be appreciated that it can be implemented using other operating systems that employ graphical interfaces such as the Apple Macintosh operating system. Here, the RAN 56 is shown as part of a network editor screen 102 which can be generated by the network editor 54. In order to illustrate the operation of the data management system, the RAN 56 shown in FIG. 3 has been constructed to exemplify an elementary operation on selected flight data. The RAN 56 includes a group of functional element symbols 104–118 which represent the type of functional element routines shown in 92 of FIG. 2. In the RAN 56 of FIG. 3 these functional element symbols are: the PARAM symbol 104 which represents the flight data parameter airspeed as indicated by the letters CAS; the CONSTANT symbol 106 which represents a constant value equal to an airspeed of 200.00 knots; the STORAGE symbol 108 for storing the current value of airspeed; the COMPARE symbol 110 for comparing the values of two types of data; the SPLITTER symbol 112 for splitting a data input into a first output representing the value of the data and a second output representing the validity of the data; the INVERTER symbol 114 for inverting boolean logic signal; the OR gate symbol 116; the LEADING EDGE DETECTOR symbol 118 for determining if boolean data is changing from False to True; and the REPORT symbol 120 for generating a report.

The functional element symbols 104–120, as shown in FIG. 3, are connected by a set of connection lines 122–132. The purpose of the connection lines 122–132 is to provide a graphical representation of logic and data flow between the functional element symbols 104–120. In the preferred embodiment of the invention color is used to represent the characteristics of the connection lines 122–132. For example, the connection lines 122 and 124 that connect the PARAM symbol 104 and the CONSTANT symbol 106 with the STORAGE symbol 108 and the SPLITTER symbol 110 are red which designate that floating point data values along with a boolean data validity signal are being transferred. By contrast, the connection lines 126–132 that connect the function element symbols 110–120 are black which denotes that boolean true/false or validity signal is being transferred. In the drawing of FIG. 3, the red connection lines 122 and 124 are indicated by solid black lines and the black connection lines 126–132 are indicated by dotted lines. In addition to red and black, other colors can be used to indicate different types of data such as blue for integer values and yellow for character strings. Each of the function element symbols 104–120 has at least one input port or one output port or both input and output ports to which the connection lines 122–132 can be drawn. For example, the PARAM symbol 104 has a single output port 134, the COMPARE symbol 110 has a pair of input ports 136 and 138 along with an output port 142 and the REPORT symbol 120 has a single input port 142. Preferably, the network editor program 54 will only permit connection lines such as 122–132 to be drawn between function element symbols such as 104–120 that have the capability of receiving or processing the type of data or information indicated by the color of the lines.

Along with a conventional Windows type tool bar 144 and a button bar 146 for editing and control functions, the network editor screen 102 of FIG. 3 includes a symbol palette 148 which includes at least the most commonly used functional element symbols such as symbols 104–120. One of the advantages of the symbol palette 148 is that it makes it particularly convenient to construct a RAN such as the RAN 56 by using the mouse 40A to drag and drop the functional element symbols 104–120 from the palette 148 to the desired locations on the screen 102. After the functional element symbols 104–120 are placed on the screen 102, the mouse 40A can also be used to draw the connection lines 122–132.

The object of the particular data management function defined by the RAN 56 shown in FIG. 3 is to generate a report when the airspeed of the aircraft 10 drops below 200 knots or if the airspeed signal becomes invalid. The data management operation as defined by the RAN 56 starts with the input of airspeed as indicated by the PARAM symbol 104 which is then transmitted as shown by the connection line 122 to storage as indicated by the STORAGE symbol 108 and to a signal SPLITTER represented by the SPLITTER symbol 112. Along with airspeed, a constant representing 200 knots is applied, as indicated by the connection line 124, from a constant signal source identified by the CONSTANT symbol 106 to a comparator as represented by the COMPARE symbol 110. If the airspeed drops below 200 knots, the comparator as indicated by the connection line 128 will output a boolean true signal to an OR gate corresponding to the OR gate symbol 116. The splitter corresponding to the SPLITTER symbol 112 will output, as indicated by the connection line 126, a boolean validity signal representing the validity portion of the airspeed signal to an inverter corresponding to the INVERTER symbol 114. The inverted validity signal as indicated by the connection line 127 is also applied to the OR gate and the logic output of the OR gate represented by the OR gate symbol 116 is then applied to the leading edge detector corresponding to the DETECTOR symbol 118. As a result, if either the airspeed drops below 200 knots or if the airspeed validity becomes invalid, the detector will apply a boolean true signal as indicated by the connection line 132, to the report generator represented by the REPORT symbol 120. The report generator will then generate a report which indicates that either of these two events have happened and what the airspeed was when it happened using the data store represented by the STORAGE symbol 108.

Figure 4:
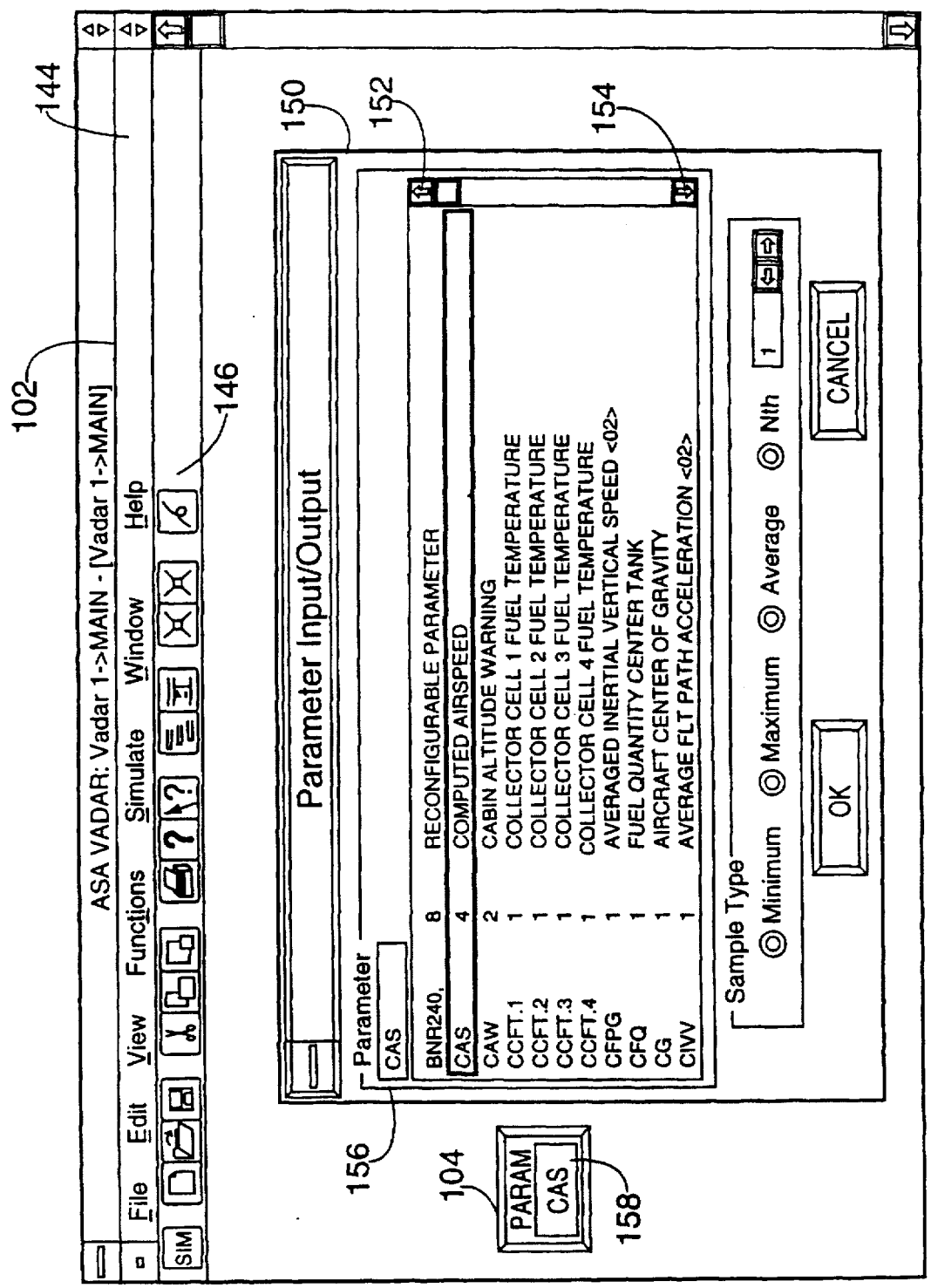
FIG. 4 is a screen display of a parameter input/output window for use in the development of the reconfigurable algorithmic network of FIG. 3.

As further illustration of the features of the network editor 54, FIG. 4 provides a partial view of the screen 102 during the development of the RAN 56. In this case, after the selection of the PARAM symbol 104 from the symbol palette 148, the symbol 104 can be double clicked using the mouse 40A to display a Parameter Input/Output display window 150 which displays all of the flight data parameters which are available to the RAN 56. The flight data parameters can be scrolled in the window 150 using a pair of scroll buttons 152 and 154. The desired parameter, in this case computed airspeed as shown by the shaded portion 156 of the window, is selected by the mouse 40A for the PARAM symbol 104 and a corresponding designation "CAS" 158 is displayed in the PARAM symbol 104.

Figure 5:
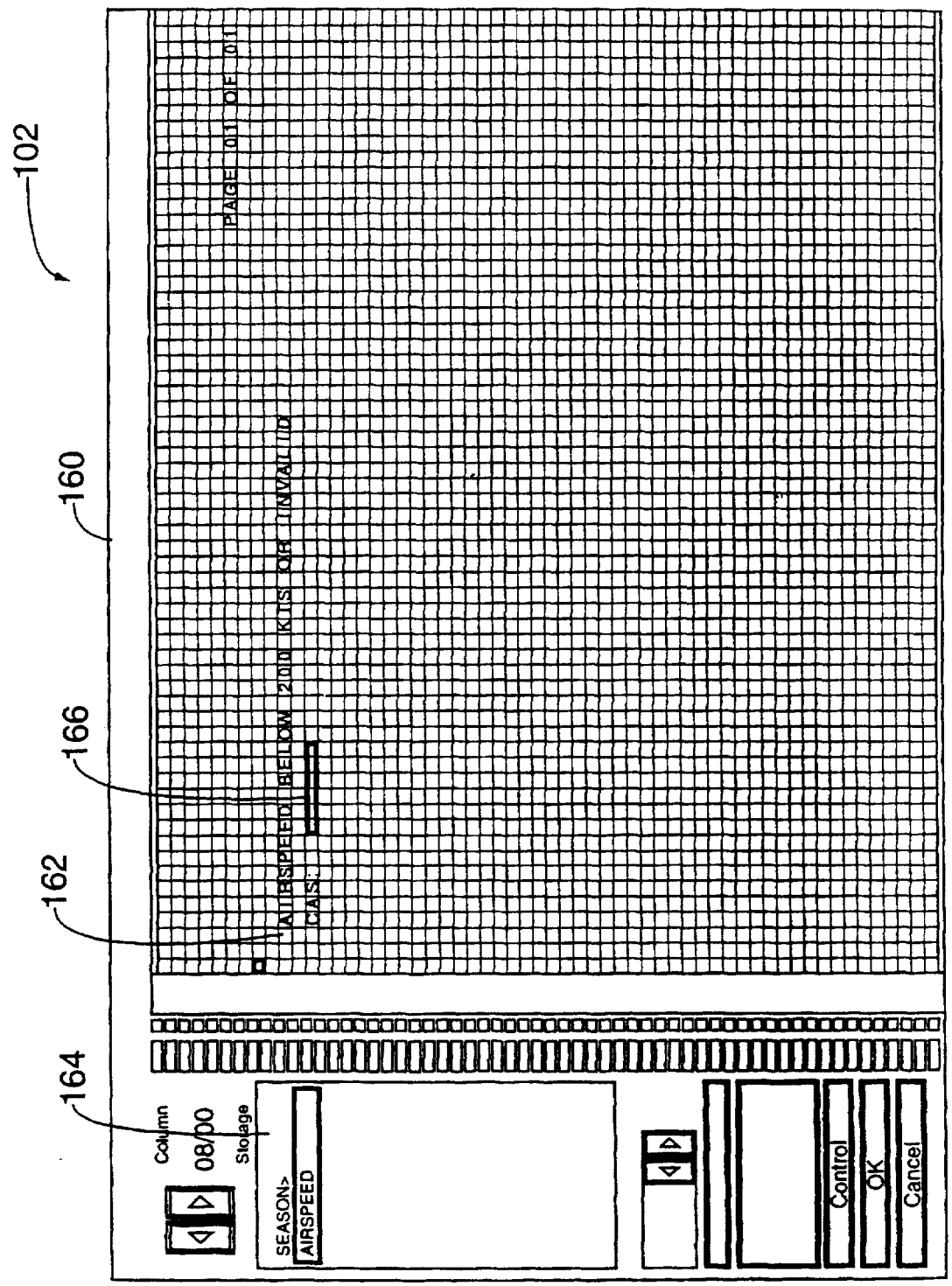
FIG. 5 is a screen display of a report format window for use in the development of the reconfigurable algorithmic network of FIG. 3.

Similarly, as illustrated in FIG. 5, by double clicking on the REPORT symbol 120 a report format window 160 is displayed. Here, the keyboard 40B can be used to type in the text of the report as indicated at 162. Displayed in a list 164 in the left hand portion of the report format window 160 are the flight parameters or other values stored by the RAN 56 such as airspeed stored in the STORAGE symbol 108. By highlighting the desired value in the list 164, and then designating a location in the report format using the mouse 40C, this value or flight parameter can be placed in the report as shown, for example, by a shaded word "airspeed" 166 in the report format 160.

Figure 6:
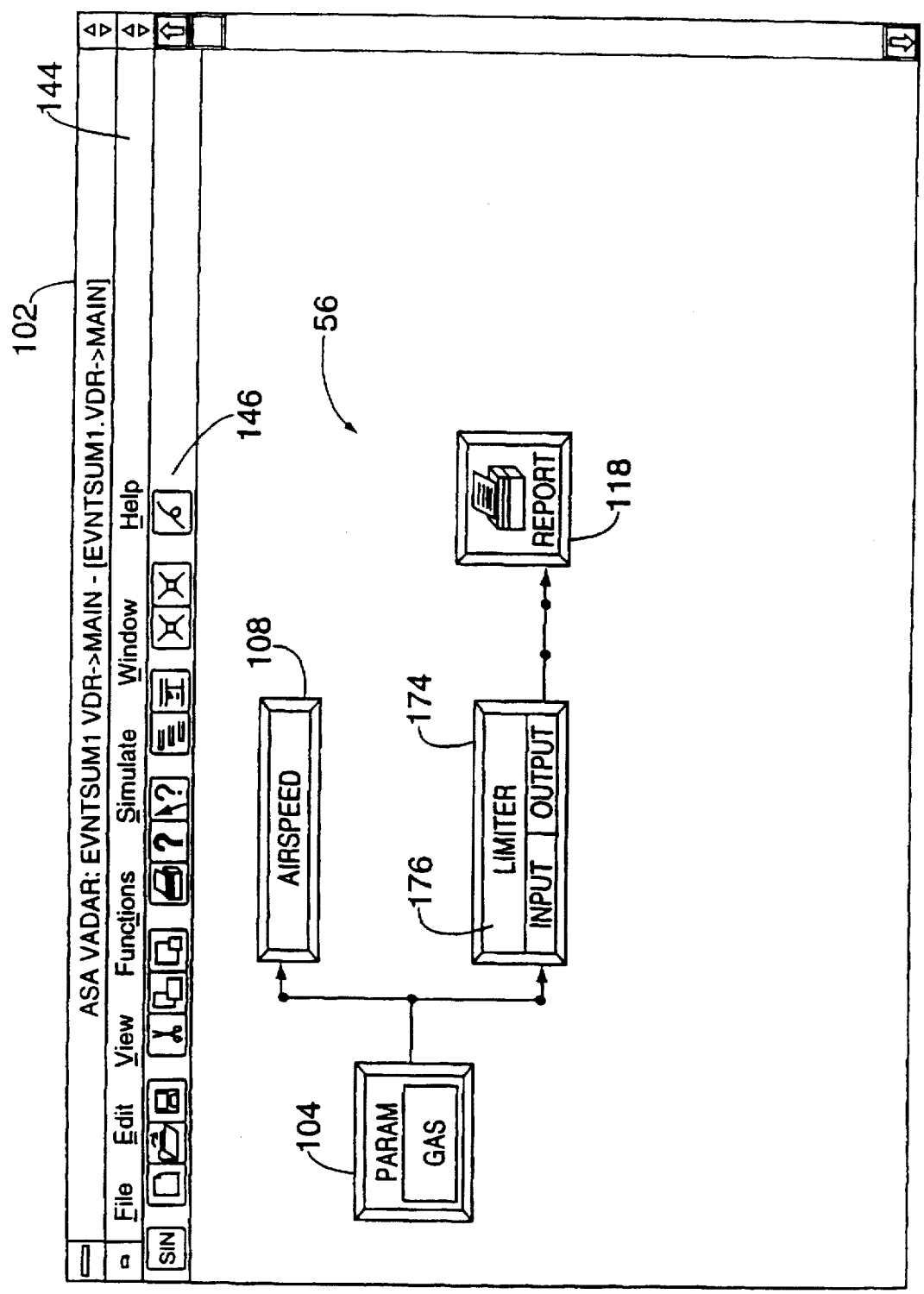
FIG. 6 is a screen display of the reconfigurable algorithmic network of FIG. 3 illustrating the use of a compressed reconfigurable algorithmic network.

Another very significant feature of the preferred embodiment of the invention, which is illustrated in FIGS. 3, 6 and 7, is the ability of the network editor 54 to compress a RAN into a functional element in a higher level RAN. With reference to the RAN 56 in FIG. 3, one method of compressing a RAN is to drag the mouse 40C over the function element symbols 106, 110,114, 116 and 118 that are to be included in a compressed RAN indicated by 168. A dashed outline 170 surrounding the compressed RAN 168 will be displayed on the screen 102 along with a collapse region option box 172. If the compressed RAN 168 within the dashed lines 170 is satisfactory, then the "yes" button in the option box 172 is clicked and the RAN 56 is displayed on screen 102 in the form shown in FIG. 6. Here, the compressed RAN 168 is displayed as a functional element symbol 174 with a name "LIMITER" 176. In this manner, it is possible to construct a hierarchy of compressed RANs so that a very complex RAN can be displayed on one screen such as screen 102.

It will be appreciated that method of creating reconfigurable algorithmic networks, RANs 56, using the above described visual programming techniques, which can be implemented using conventional Windows programming methods, provides a very powerful and flexible way of managing and using the large amounts of flight data that are available in commercial aircraft 10. Not only can RANs 56 be easily created and debugged, but they can be modified to suit new requirements with minimal effort. In addition, because the RANs 56 are interpreted, they can be executed on a variety of computer systems without reprogramming.

We claim:

1. A hardware independent data management system for use with aircraft comprising:
   a) a plurality of flight data sources for generating a plurality of flight data;
   b) a computer;
   c) transmittal means for transmitting at least a portion of said flight data from said flight data sources to said computer;
   d) a reconfigurable algorithmic network, resident on said computer, that defines a set of predetermined operations on a predetermined set of said flight data, said reconfigurable algorithmic network including:
      1) a plurality of functional elements, each of said functional elements defining one or more of said predetermined operations;
      2) a data base, said data base including:
         a) a plurality of codes defining one or more of said functional elements,
         b) a plurality of computer routines for executing said functional elements, and
         c) connection means for directing logic flow and data flow between said functional elements;
   e) interpreter means, resident on said computer, for interpreting said set of flight data in accordance with said reconfigurable algorithmic network, said interpreter means including connection means for defining operational relationships between said functional elements, wherein said interpreter means receives said functional element codes from said data base and selects one of said computer routines; and
   f) an input/output device for transferring information to and from the aircraft, said input/output device receiving one or more data transfer medium.

2. The system of claim 1 additionally including development means, having a display, for developing said reconfigurable algorithmic network wherein said algorithmic network is visually represented on said display with a plurality of element symbols representing said functional elements and a plurality of connetion lines representing said connection means.

3. The system of claim 2 wherein said development means includes a set of functional element symbols displayed on said display and user interface means for selecting said element symbols from said set of functional element symbols and for connecting said element symbols with said connection lines.

4. The system of claim 3 wherein said user interface means includes mouse means for selecting said element symbols from said set of functional element symbols and drawing said connection lines.

5. The system of claim 4 wherein said connection lines are represented by a plurality of colors on said display and wherein said colors represent data types.

6. The system of claim 4 wherein at least one of said functional element symbols is a aircraft parameter symbol which represents said flight data parameters.

7. The system of claim 6 wherein said user interface means includes parameter display means for displaying a list of said flight data parameters on said display and said display operator input means includes selection means for associating a parameter from said list with one of said element symbols on said display.

8. The system of claim 2 wherein said development means includes simulator means for simulating the operation of said reconfigurable algorithmic network.

9. The system of claim 8 wherein said simulator means includes a simulator interpreter for interpreting said reconfigurable algorithmic network.

10. The system of claim 9 wherein said simulator means includes a simulated set of flight data for use as said flight data parameters in interpreting said reconfigurable algorithmic network.

11. The system of claim 2 wherein said transmittal means includes a first communications transceiver in the aircraft a second communications transceiver connected to said development means for transmitting said reconfigurable algorithmic network via said first communications means to said data management unit.

12. The system of claim 1 wherein one of said functional elements is a report element which defines a format of a data report and when said data report is to be generated by interpreting said reconfigurable algorithmic network.

13. The system of claim 1 wherein said computer is located on the ground, one of said functional elements is a report element, and said interpreter generates a data report for at least a portion of said flight data.

14. The system of claim 13 wherein said transmittal means includes a first communications transceiver in the aircraft and a second transceiver connected to said computer for transmitting said portion of flight data from the aircraft to said computer.

15. The system of claim 1 wherein said system includes a data management unit located in the aircraft includes said interpreter and said reconfigurable algorithmic network, said transmittal means additionally transmits at least a portion of said flight data to said data management unit and said interpreter interprets said reconfigurable algorithmic network.

16. The system of claim 15 additionally including a display located on the aircraft and wherein said reprogammable algorithmic network includes a report functional element and said interpreter generates a flight data display on said display.

17. A data management system for use with aircraft having a plurality of flight data sources for generating a plurality of flight data, the data management system comprising:
a computer receiving at least a portion of the flight data from the flight data sources;
a reconfigurable algorithmic network, resident on said computer, that defines a set of predetermined operations on a predetermined set of said flight data, said reconfigurable algorithmic network including
a plurality of functional elements, each of said functional elements defining at least one of said predetermined operations,
said predetermined operations including a compressed reconfigurable algorithmic network;
an interpreter, resident on said computer, said interpreter interpreting said set of flight data in accordance with said reconfigurable algorithmic network and defining operational relationships between said functional elements; and
a plurality of computer routines, resident on said computer, for executing said functional elements.

18. A data management system for use with aircraft comprising:
a plurality of flight data sources for generating a plurality of flight data;
a computer;
transmittal means for transmitting at least a portion of said flight data from said flight data sources to said computer;
a reconfigurable algorithmic network resident on said computer, that defines a set of predetermined operations on a predetermined set of said flight data, said reconfigurable algorithmic network including:
a plurality of functional elements wherein each of said functional elements defines at least one of said predetermined operations,
connection means for defining the operational relationships between said functional elements, and
a compressed reconfigurable algorithmic network; and
interpreter means, resident on said computer, for interpreting said set of flight data in accordance with said reconfigurable algorithmic network wherein said compressed reconfigurable network is represented in said reconfigurable network as one of said functional elements.

19. A data management system for use with aircraft comprising:
a plurality of flight data sources for generating a plurality of flight data;
a computer;
transmittal means for transmitting at least a portion of said flight data from said flight data sources to said computer;
a reconfigurable algorithmic network, resident on said computer, that defines a set of predetermined operations on a predetermined set of said flight data, said reconfigurable algorithmic network including:
a plurality of functional elements wherein each of said functional elements defines at least one of said predetermined operations,
connection means for defining the operational relationships between said functional elements, and
a compressed reconfigurable algorithmic network; and
interpreter means, resident on said computer, for interpreting said set of flight data in accordance with said reconfigurable algorithmic network wherein said reconfigurable algorithmic network includes a hierarchy of said compressed reconfigurable networks.

20. The method of claim 19, further comprising the step of transferring information to the aircraft using an input/output device, said input/output device receiving one or more data transfer medium.

21. The method of claim 19, further comprising the step of transferring information from the aircraft using an input/output device, said input/output device receiving one or more data transfer medium.

22. A method of data management for use with an aircraft computer, comprising the steps of:

receiving at the aircraft computer, a plurality of flight data from a plurality of flight data sources;

developing a reconfigurable algorithmic network resident on the computer, said reconfigurable algorithmic network defining a set of predetermined operations on a predetermined set of said flight data, said reconfigurable algorithmic network including a plurality of functional elements, each of said functional elements defining one or more of said predetermined operations; and interpreting said set of flight data in accordance with said reconfigurable algorithmic network, said interpreting step including receiving said functional elements from said reconfigurable algorithmic network, defining operational relationships between said functional elements and selecting computer routines for executing said functional elements.

23. A hardware independent data management device for use with flight data received from a plurality of flight data sources, the device comprising:

a computer;

a reconfigurable algorithmic network, resident on said computer, that defines a set of predetermined operations on a predetermined set of the flight data, said reconfigurable algorithmic network including a plurality of functional elements, each of said functional elements defining one or more of said predetermined operations on a predetermined set of the flight data;

an interpreter, said interpreter receiving said functional elements from said reconfigurable algorithmic network and defining operational relationships between said functional elements for interpreting said set of flight data in accordance with said reconfigurable algorithmic network; and an input/output device for receiving the flight data and for transferring information to and from the aircraft.

* * * * *

UNITED STATES PATENT AND TRADEMARK OFFICE
CERTIFICATE OF CORRECTION

PATENT NO. : 5,761,625
DATED : June 2, 1998
INVENTOR(S) : Honcik et al.

It is certified that error appears in the above-identified patent and that said Letters Patent is hereby corrected as shown below:

Column 1, line 58: delete [defined] and substitute therefor --define--.

Claim 11, line 2 (column 9, line 38): after "aircraft" insert --and--.
Claim 12, line 3 (column 9, line 45): delete [when] and substitute therefor --wherein--.
Claim 15, line 2 (column 9, line 57): after "aircraft" insert --and--.
Claim 22, line 5 (column 11, line 16): after "network" insert --,--.

Signed and Sealed this

First Day of September, 1998

Attest:

Attesting Officer

BRUCE LEHMAN

Commissioner of Patents and Trademarks